US011256959B2

(12) United States Patent
Iyer et al.

(10) Patent No.: US 11,256,959 B2
(45) Date of Patent: Feb. 22, 2022

(54) METHOD AND SYSTEM FOR TRAINING ARTIFICIAL NEURAL NETWORK BASED IMAGE CLASSIFIER USING CLASS-SPECIFIC RELEVANT FEATURES

(71) Applicant: Wipro Limited, Bangalore (IN)

(72) Inventors: Manjunath Ramachandra Iyer, Bangalore (IN); Chandrashekar Bangalore Nagaraj, Bangalore (IN); Vinutha Bangalore Narayanamurthy, Bangalore (IN)

(73) Assignee: Wipro Limited, Bangalore (IN)

( * ) Notice: Subject to any disclaimer, the term of this patent is extended or adjusted under 35 U.S.C. 154(b) by 51 days.

(21) Appl. No.: 16/794,486

(22) Filed: Feb. 19, 2020

(65) Prior Publication Data
US 2021/0201082 A1 Jul. 1, 2021

(30) Foreign Application Priority Data
Dec. 31, 2019 (IN) .............................. 201941054782

(51) Int. Cl.
G06K 9/62 (2006.01)
G06K 9/46 (2006.01)
G06N 3/08 (2006.01)

(52) U.S. Cl.
CPC ............ *G06K 9/6262* (2013.01); *G06K 9/46* (2013.01); *G06K 9/628* (2013.01); *G06K 9/6256* (2013.01); *G06N 3/08* (2013.01)

(58) Field of Classification Search
None
See application file for complete search history.

(56) References Cited

U.S. PATENT DOCUMENTS

2018/0018553 A1* 1/2018 Bach .................... G06K 9/4628
2019/0354860 A1* 11/2019 Karg ........................ G06N 3/08

OTHER PUBLICATIONS

Kumar, G., et al., "A Detailed Review of Feature Extraction in Image Processing Systems", IEEE 2014, pp. 5-12.
Thomas, E., et al., "Encoding of Categories by Noncategory-Specific Neurons in the Inferior Temporal Cortex", Journal of Cognitive Neuroscience 2000, 13:190-200, pp. 1-20.

* cited by examiner

*Primary Examiner* — Leon Flores
(74) *Attorney, Agent, or Firm* — Finnegan, Henderson, Farabow, Garrett & Dunner, LLP (57) ABSTRACT

The disclosure relates to method and system for training an artificial neural network (ANN) based image classifier using class-specific relevant features. The method includes receiving the ANN based image classifier, training image dataset, and various features of the training image dataset. The method further includes determining a relative relevance value of each of the features corresponding to each of the classes based on the ANN based image classifier, segregating co-occurring features from the features for each of the classes based on the training image dataset and the ANN based image classifier, identifying an imbalance in the class-specific relevant features for each of the classes based on the relative relevance value of each of the features corresponding to each of the classes, and updating the ANN based image classifier based on the imbalance in the class-specific relevant features and the co-occurring features for each of the classes.

15 Claims, 6 Drawing Sheets

METHOD AND SYSTEM FOR TRAINING ARTIFICIAL NEURAL NETWORK BASED IMAGE CLASSIFIER USING CLASS-SPECIFIC RELEVANT FEATURES

TECHNICAL FIELD

The present invention relates to artificial neural networks (ANN). More particularly, the present invention is directed to method and system for training an ANN based image classifier using class-specific relevant features.

BACKGROUND

Feature extraction is a common technique employed in a wide variety of pattern recognition, machine learning (ML), deep learning (DL), and image processing applications. The feature extraction technique involves extracting relevant features from the input. The variables from input data are selected and/or combined to form features that describe the input data accurately and completely. As will be appreciated, the extracted features reduce the dimensionality of input data for efficient and effective processing.

Conventional feature extraction techniques provide relevant but reduced features that are informative, generalized, and non-redundant. For most of the ML/DL application, the optimized features help in generating models (e.g., image classifiers) that are efficient and accurate. For example, conventional feature extraction techniques provide reduced feature vector corresponding to an input image, which is generic, has less variables and with sufficient accuracy. However, conventional feature extraction techniques are limited in their ability to provide features with class-specific information (i.e., class-specific features, or features relevant to specific class). The lack of class-specific information in the extracted features result in sub-par performance (i.e., increased computations and reduced accuracy) of the classification models (i.e., classifiers).

SUMMARY

In one embodiment, a method for updating an artificial neural network (ANN) based image classifier using class-specific relevant features is disclosed. In one example, the method may include receiving the ANN based image classifier, training image dataset, and a plurality of features of the training image dataset. The method may further include determining a relative relevance value of each of the plurality of features corresponding to each of a set of classes, based on the ANN based image classifier. The method may further include segregating a set of co-occurring features from the plurality of features for each of the set of classes, based on the training image dataset and the ANN based image classifier. The method may further include identifying an imbalance in the class-specific relevant features for each of the set of classes based on the relative relevance value of each of the plurality of features corresponding to each of the set of classes. The method may further include updating the ANN based image classifier based on the imbalance in the class-specific relevant features and the set of co-occurring features, for each of the set of classes.

In another embodiment, a system for updating an ANN based image classifier using class-specific relevant features is disclosed. In one example, the system may include a processor and a memory communicatively coupled to the processor. The memory may store processor-executable instructions, which, on execution, may causes the processor to receive the ANN based image classifier, training image dataset, and a plurality of features of the training image dataset. The processor-executable instructions, on execution, may further cause the processor to determine a relative relevance value of each of the plurality of features corresponding to each of a set of classes, based on the ANN based image classifier. The processor-executable instructions, on execution, may further cause the processor to segregate a set of co-occurring features from the plurality of features for each of the set of classes, based on the training image dataset and the ANN based image classifier. The processor-executable instructions, on execution, may further cause the processor to identify an imbalance in the class-specific relevant features for each of the set of classes based on the relative relevance value of each of the plurality of features corresponding to each of the set of classes. The processor-executable instructions, on execution, may further cause the processor to update the ANN based image classifier based on the imbalance in the class-specific relevant features and the set of co-occurring features, for each of the set of classes.

In yet another embodiment, a non-transitory computer-readable medium storing computer-executable instruction for updating an ANN based image classifier using class-specific relevant features is disclosed. In one example, the stored instructions, when executed by a processor, may cause the processor to perform operations including receiving the ANN based image classifier, training image dataset, and a plurality of features of the training image dataset. The operations may further include determining a relative relevance value of each of the plurality of features corresponding to each of a set of classes, based on the ANN based image classifier. The operations may further include segregating a set of co-occurring features from the plurality of features for each of the set of classes, based on the training image dataset and the ANN based image classifier. The operations may further include identifying an imbalance in the class-specific relevant features for each of the set of classes based on the relative relevance value of each of the plurality of features corresponding to each of the set of classes. The operations may further include updating the ANN based image classifier based on the imbalance in the class-specific relevant features and the set of co-occurring features, for each of the set of classes.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
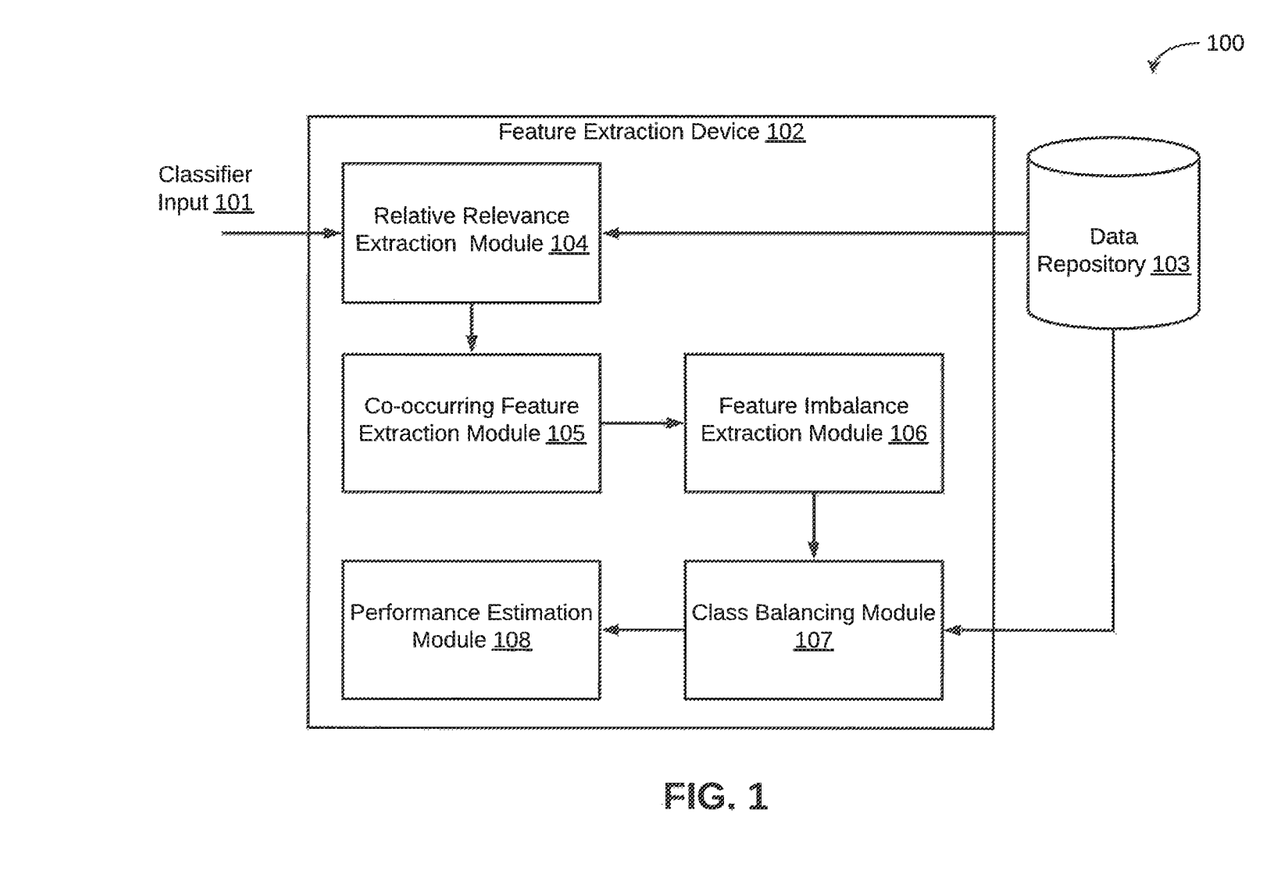
FIG. 1 is a block diagram of an exemplary system for extracting class-specific relevant features and for updating an artificial neural network (ANN) based image classifier using extracted class-specific relevant features, in accordance with some embodiments of the present disclosure.

Referring now to FIG. 1, an exemplary system 100 for extracting class-specific relevant features and for updating an artificial neural network (ANN) based image classifier using extracted class-specific relevant features is illustrated, in accordance with some embodiments of the present disclosure. The system 100 includes a classifier unit (now shown), a feature extraction device 102, and a data repository 103. The classifier unit (not shown) implements the ANN based image classifier to perform image classification for various applications. As will be discussed in greater detail below, the feature extraction device 102 may include various modules to perform different operations so as to extract class-specific relevant features and to update the ANN based image classifier using the extracted class-specific relevant features. In particular, the feature extraction device 102 may include a relative relevance extraction module 104, a co-occurring feature extraction module 105, a feature imbalance extraction module 106, a class balancing module 107, and a performance estimation module 108. Each of these modules 104-108 will be described in greater detail below. The data repository 103 is a large storage that collects, manages, and stores different type of datasets including, but not limited to, training image dataset, relative relevance value of each feature with respect to each class, co-occurring features with respect to each class, and so forth.

The relative relevance extraction module 104 receives classifier input 101 from the ANN based image classifier that is to be updated and trained by the feature extraction device 102. The classifier input 101 includes the ANN based classifier (i.e., weights of neurons, architectural information of the classifier, etc.) as well as the training image dataset used for preliminary training of the ANN based image classifier. The relative relevance extraction module 104 further receives multiple features associated with the training image dataset from the data repository 103.

The relative relevance extraction module 104 then computes a relative relevance value of each of the features corresponding to each of the classes. The computation of the relative relevance value of features may be executed by employing a layer-wise relevance propagation (LRP) technique. By the application of LRP technique, the relative relevance extraction module 104 determines a contributory value of each of the multiple features in the classifier input 101 corresponding to a class to an output of the ANN based image classifier belonging to that class. The computed relative relevance value of different features may be stored in the data repository 103. The relative relevance extraction module 104 may be communicatively coupled to the co-occurring feature extraction module 105. Further, the relative relevance-extraction module 104 sends the computed relative relevance value of features to the co-occurring feature-extraction module 105.

The co-occurring feature extraction module 105 is communicatively interlinked between the relative relevance extraction module 104 and feature imbalance estimation module 106. The co-occurring feature extraction module 105 receives the computed relative relevance value of features corresponding to each of the classes from its input terminal and performs an analysis on the same. Further, the co-occurring feature extraction module 105 is designed to separate co-occurring features corresponding to each of the classes based on the on the input training image dataset (comprising images for each of the classes) and the ANN based image classifier. In other words, the co-occurring feature extraction module 105 segregates co-occurring features corresponding to each of the classes from all the features belonging to the training image dataset. It should be noted that the co-occurring feature extraction module 105 identifies and associates the features that have a high probability (say, in at least about 80% of the instances) of occurring together in a given class, wherein a threshold for considering the probability as high may be adjusted to enhance the accuracy of the feature extraction device 102. For example, green feather and red beak have a high probability of occurring together while classifying a parrot. The set of co-occurring features corresponding to each of the classes may be transmitted to the coupled feature imbalance extraction module 106.

The feature imbalance extraction module 106 receives the co-occurring features for each of the classes at its input peripheral. The feature imbalance extraction module 106 may be designed to identify an imbalance in the class-specific relevant features for each of the classes. The identification of the imbalance in class-specific relevant features depends upon the co-occurring features corresponding to each of the classes. The feature imbalance extraction module 106 performs its operation by analyzing the characteristics of features corresponding to each of the classes and their respective relevance. In other words, the feature imbalance extraction module 106 detects weak and strong features, positive and negative features (detailed description of these features have been provided in conjunction with FIG. 2) with respect to each of the classes. The feature imbalance extraction module 106 may be attached to the class balancing module 107 in order to transmit the identified imbalance in the class-specific relevant features for each of the classes.

The class balancing module 107 may be interlinked between the class balancing module 107 and data repository 103 to receive data. The class balancing module 107 receives information about the different features contributing to each of the classes (i.e., imbalance in the class-specific relevant features for each of the classes) from the feature imbalance-estimation module 106. To this end, the class balancing module 107 is fed with the details of the stored dataset in the data repository 103. After receiving the information, the class-balancing module 107 corrects the imbalance in the class specific relevant features for each of the classes. In some embodiments, the correction may be performed by fine tuning the image classifier so as to balance out the relevance among various class-specific features for each of the classes. The fine-tuning is performed to ensure each set of the set of classes have adequate and equal features contributing for classification. For example, the class-balancing module 107 updated (and/or removes) weights of the neurons based on weak, strong, positive, and negative features of each specific class. In other words, the class balancing module 107 generates a weight readjusted image classifier, by updating weights of one or more neurons in the ANN based image classifier, based on the imbalance in the class-specific relevant features. The generated weight readjusted image classifier may be transmitted to the performance estimation module 108.

The performance estimation module 108 receives the fine-tuned or weight readjusted image classifier from its input terminal. The performance estimation module 108 may then evaluate a performance of the weight readjusted image classifier. In particular, the performance estimation module 108 analyzes the performance of the weight readjusted image classifier and accordingly provides iterative training of the classifier. The performance estimation module 108 re-trains the weight readjusted image classifier based on the based on the imbalance in the class-specific relevant features and the co-occurring features for each of the classes. In some embodiments, the re-trained classifier is again provided as the input to the relative relevance-extracting module 104 for further evaluation and improvement.

The ANN based classifier may include, but is not limited to, a convolutional neural network (CNN) based classifier and a deep neural network (DNN) based classifier. The relative relevance extraction module 104 analyzes a dense layer of the network as its relevance values are rich in class specific information, aiming to get better updation of the ANN based classifier. These relevance values may be considered further to remove irrelevant features and obtain a reduced feature vector of the classifier input 101. Now, this feature vector of the classifier input 101 may be utilized for updating the classifier for different applications with reduced computations and good accuracy. The present system 100 identifies actual contributing nodes to a class by computing relative relevance making use of its contribution to the class as well as non-contribution to other classes. Further, the system 100 helps in removing the non-contributing/irrelevant features while updating the classifier. In addition, the features that are common across more than one class, are assigned with less weightage to reduce chances of misclassifications It should be noted that the feature extraction device 102 may be implemented in programmable hardware devices such as programmable gate arrays, programmable array logic, programmable logic devices, or the like. Alternatively, the feature extraction device 102 may be implemented in software for execution by various types of processors. An identified engine/module of executable code may, for instance, include one or more physical or logical blocks of computer instructions which may, for instance, be organized as an object, module, procedure, function, or other construct. Nevertheless, the executables of an identified engine/module need not be physically located together but may include disparate instructions stored in different locations which, when joined logically together, comprise the identified engine/module and achieve the stated purpose of the identified engine/module. Indeed, an engine or a module of executable code may be a single instruction, or many instructions, and may even be distributed over several different code segments, among different applications, and across several memory devices.

As will be appreciated by one skilled in the art, a variety of processes may be employed for extracting class-specific relevant features and for updating the ANN based image classifier. For example, the exemplary system 100 and associated feature extraction device 102 may update the ANN based classifier, by the process discussed herein. In particular, as will be appreciated by those of ordinary skill in the art, control logic and/or automated routines for performing the techniques and steps described herein may be implemented by the system 100 and the associated feature extraction device 102 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all the processes described herein may be included in the one or more processors on the system 100.

Figure 2:
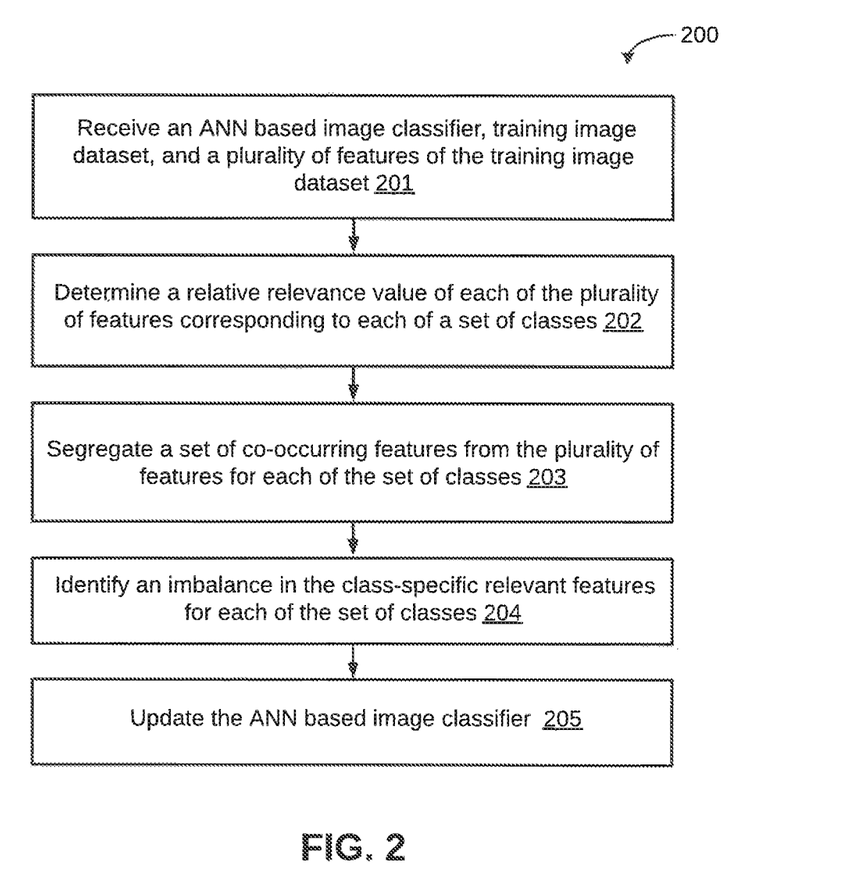
FIG. 2 is a flow diagram of an exemplary process for extracting class-specific relevant features and for updating an ANN based image classifier using extracted class-specific relevant features, in accordance with some embodiments of the present disclosure.

Referring now to FIG. 2, an exemplary process 200 for extracting class-specific relevant features and for updating an ANN based classifier using extracted class-specific relevant features is depicted via a flowchart, in accordance with some embodiments of the present disclosure. All the steps of the process 200 are performed by employing the feature extraction device 102. At step 201, the ANN based image classifier, training image dataset, and a plurality of features of the training image dataset are received by the feature extraction device 102. At step 202, a relative relevance value of each of the plurality of features corresponding to each of a set of classes is determined based on ANN based image classifier. In some embodiments, the relevance value is computed based on setting the output as the perfect output for a given class and back-propagating. For example, a layer-wise relevance propagation (LRP) technique is applied to the ANN based image classifier so as to determine a contributory value of each of the plurality of neural nodes to an output of the ANN based image classifier. It should be noted that the output corresponds to the given class.

At step 203, a set of co-occurring features from the plurality of features for each of the set of classes is segregated based on the training image dataset and the ANN based image classifier. In some embodiments, a set of neural nodes is identified relevant to a given class based on their co-occurrence for a majority of the training image dataset belonging to the given class. Additionally, in some embodiments, the majority comprises at least about 80% of the training image dataset.

At step 204, an imbalance in the class-specific relevant features for each of the set of classes is identified based on the relative relevance value of each of the plurality of features corresponding to each of the set of classes. In some embodiments, the identification of imbalance in the class-specific relevant features further includes evaluation of the relative relevance value of each of the plurality of features corresponding to a given class. Additionally, in some embodiments, the identification of imbalance in the class-specific relevant features further includes determination of at least one of a weak feature, a strong feature, a positive feature, or a negative feature of the given class based on the evaluation. It should be noted that the strong feature or the positive features are aligned with characteristics of the given class, while the weak feature or the negative features are not aligned with characteristics of the given class. For example, a strong or a positive feature may be a feature that is more aligned or uniquely aligned with the characteristics of a given class (say, a feature that contribute or appear for the given class only), while a weak or a negative feature may be a feature that is less aligned or not uniquely aligned with the characteristics of a given class (say, a feature that contribute or appear for more than one class).

At step 205, the ANN based image classifier is updated based on the imbalance in the class-specific relevant features and the set of co-occurring features for each of the set of classes. In some embodiments, the updating of the ANN based image classifier includes generation of a weight readjusted image classifier by updating weights of one or more neurons in the ANN based image classifier, based on the imbalance in the class-specific relevant features and the set of co-occurring features for each of the set of classes. Additionally, in some embodiments, the updating of the ANN based image classifier further includes evaluation of a performance of the weight readjusted image, and re-training of the weight readjusted image classifier based on the performance. In other words, if the fine-tuning of the weights of the ANN based image classifier does not help in reduction/removal of class imbalance, the ANN based image classifier is re-trained to reduce/remove the class imbalance. It should be noted that, in some embodiments, re-training data is selected based on the imbalance in the class-specific relevant features and the set of co-occurring features for each of the set of classes.

Figure 3:
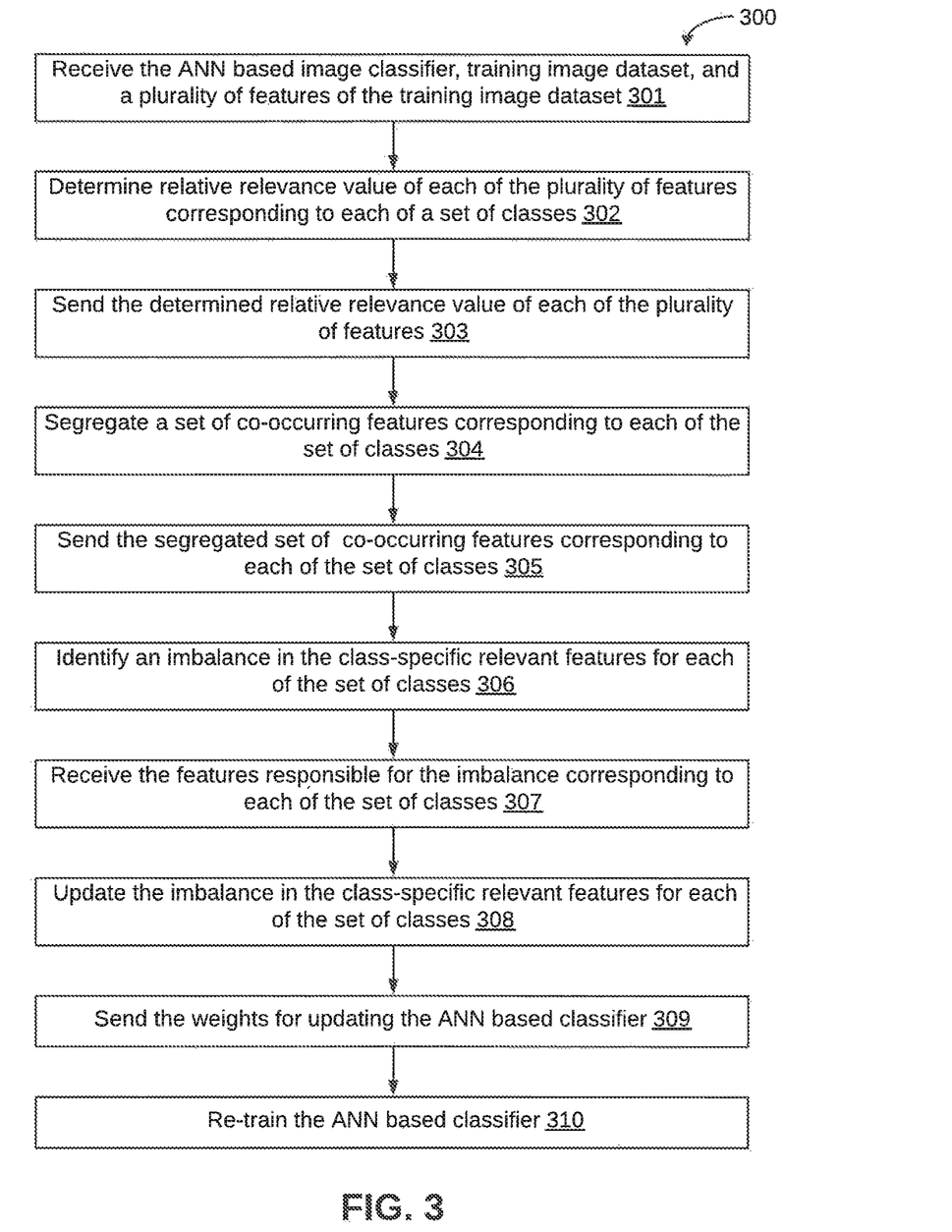
FIG. 3 is a flow diagram of a detailed exemplary process for extracting class-specific relevant features and for updating an ANN based image classifier using extracted class-specific relevant features, in accordance with some embodiments of the present disclosure.

Referring now to FIG. 3, exemplary process 300 for extracting class-specific relevant features and for updating an ANN based image classifier using extracted class-specific relevant features is depicted in greater detail via a flowchart, in accordance with some embodiments of the present disclosure. At step 301, the ANN based image classifier, training image dataset, and features associated with the training image dataset are received by the relative relevance extraction module 104. These inputs may be received from the classifier unit (not shown) as classifier input 101 and/or from the data repository 103. In some embodiments, the classifier input 101 includes at least the ANN based image classifier and input from the data repository 103 includes at least features associated with the training image dataset. Various sub-processes such as those described below may be then performed on the received input so as to fine-tune the ANN based image classifier and remove any biasing of features available in the classifier.

At step 302, relative relevance value of each of the features is determined corresponding to each class by the relative relevance module 104, based on the ANN based image classifier. It should be noted that the relative relevance values of the features are used to identify a set of features contributing to a specific class. In this step, a class-wise and a layer-wise relative relevant features are extracted. In other words, the features that are relevant for each of the classes are extracted separately for further processing. In some embodiments, the back-propagation technique may be applied for each of the classes for extracting features relevant to the corresponding class. For example, LRP may be applied to each class independently for generating the relative relevance value of the features corresponding to that class. The extraction of relative relevance value of different features for each class is explained in greater detail in conjunction with FIG. 4 below.

At step 303, the determined relative relevance value of each of the features corresponding to each class may be sent, by the relative relevance-extracting module 104, to the co-occurring feature extracting module 105. At step 304, co-occurring features corresponding to each class is segregated from the features, based on the training image dataset and the ANN based image classifier, by the co-occurring feature extraction module 105. The nodes that are relevant to the specific class and occurring together in most (at least about 80%) of the training image dataset belonging to that class may be identified as co-occurring. It should be noted that the segregation of co-occurring features ensure that the co-occurring patterns are accounted for while detecting feature imbalance detailed in step 306. The segregation of co-occurring features for a class is explained in greater detail in conjunction with FIG. 5 below.

At step 305, the segregated co-occurring features corresponding to each class are sent, by the co-occurring feature-extracting module 105, to the feature imbalance-estimation module 106. At step 306, an imbalance in the class-specific relevant features is identified for each class by the feature imbalance extraction module 106. The characteristics of the class features with respect to relevance are identified so as to detect weak and strong features, positive and negative features, and so forth. In other words, the imbalance may be identified for each class based on the relative relevance value of each of the features corresponding to each class. In this step, relative relevance of different classes spanned by the sample training set are compared. A class with less relevance may then require boosting. The image classifier learns fine details of this class for better differentiation. In some embodiments, the sum of relative relevance of each class may be computed and compared. In some other embodiments, the number of relevant nodes for each class may be considered for addition and comparison. The addition may be performed for each layer from among the nodes contributing to each class. Further, the total relative relevance for the class is considered as the sum of relevance for each layer or sum of number of relevant nodes of the class for each layer. In some embodiments, the positive but weak contributions of relevant nodes towards a class are determined. As will be appreciated, such feature provides the relevant but not well-trained features. It should be noted that such features may occasionally co-occur with a dominant feature. In this way, the essential features that need to be strengthened further are identified for each class.

At step 307, information on the features contributing for each class are received, by the class balancing module 107, from the feature imbalance-estimation module 106. Further, details of the stored training image dataset are received, by the class balancing module 107, from the data repository 103. At step 308, the imbalance in the class-specific relevant features is updated for each class by the class balancing module 107. In some embodiments, the class balancing module 107 updates/removes the filters/neurons based on weak and strong features, positive and negative features, and so forth of the specific class. Thus, the imbalance of class-specific features may be corrected. In other words, the classifier is fine-tuned or re-trained to learn the class specific missing features identified at step 306. For example, in the classification of a bird as parrot, if the classifier uses wing color (green) alone as dominant feature for about 80% of the times and beak color (red) only as dominant feature for about 20% of the times, there are chances that the classifier may provide wrong classification in a case when most of the wing is not visible and only beak is dominantly visible. This may occur because the classifier is not trained uniformly with all available class-specific features. Thus, the class balancing module 107 calls for some neurons to learn the beak color, shape, etc. predominantly through retraining. Accordingly, the incremental training image dataset (e.g., images that shows red beak as dominant feature in parrot) may be selected.

At step 309, the weights for updating the ANN based image classifier are sent, by the class-balancing module 107, to the performance-estimation module 108. At step 310, the performance of fine-tuned or weight readjusted model are evaluated, by the performance-estimation module 108, in terms of relative relevance, accuracy, etc. The ANN based classifier is re-trained based on the performance evaluation. It should be noted that the fine tuning or re-training is performed to ensure each class has adequate and balanced class-specific features contributing for classification. The process is repeated until the required balance among the classes is reached. The implementation of iterative training of the classifier is explained in greater detail in conjunction with FIG. 6 below.

Figure 4:
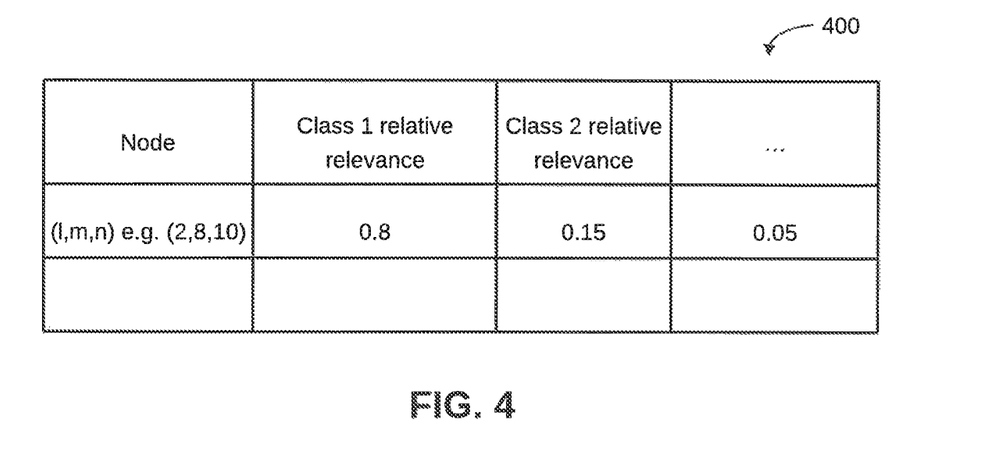
FIG. 4 is an exemplary table representing relative relevance value of each of the nodes corresponding to each of the classes, in accordance with some embodiments of the present disclosure.

Referring now to FIG. 4, an exemplary table 400 representing relative relevance value of each of the nodes corresponding to each of the classes is illustrated, in accordance with some embodiments of the present disclosure. In the illustrated embodiment, if "C1" and "C2" are two classes for a given image "Iεc1", then the two LRPs derived at the output of a certain node in a certain layer may be "$RC_1$ (l, m, n)" and "$RC_2$ (l, m, n)", where "m" and "n" are the node address in the layer "l". In some embodiments, the relative relevance Rc1 (l, m, n) of the nodes may be computed as per equation (1) below:

$$Rc1(l,m,n) = w11 * \text{contribution to intended class}(c1) - w12 * \text{contribution to complementary class}(c2) \quad \text{Equation (1)}$$

where, w11 and w12 denote weights of the node (1, 1) and node (1, 2) in layer "l".

By way of an example, the value of "w11" and "w12" may be selected as "0.6" and "0.4" respectively, indicating contribution towards a class is more important than not contributing or negatively contributing to other class. The values may vary depending upon the performance of the classifier model. When any node provides negative contribution (i.e., is negatively relevant) for the complementary classes, the relative relevance increases automatically. On the other hand, relative relevance may be reduced when the same node is relevant for more than one class.

In some other embodiments, the relative relevance in a two-class classifier may be computed as per equation (2) below:

$$RC_1(l, m, n) = \frac{w11 \times \text{contribution to intended class}(C_1)}{[w11 \times \text{contribution to intended class}(C_1)] + [w11 \times \text{contribution to complementary class}(C_2)]} \quad \text{Equation (2)}$$

It should be noted that, the denominator in equation (2) spans all of the classes (e.g., in this case 2 classes). In a similar fashion, the relative relevance of the neurons for other classes may be computed. The relevance of selected class initiates with (1−ε/N) for the selected class and F for each of the complementing classes. In an embodiment, ε is considered as 0.005.

Figure 5:
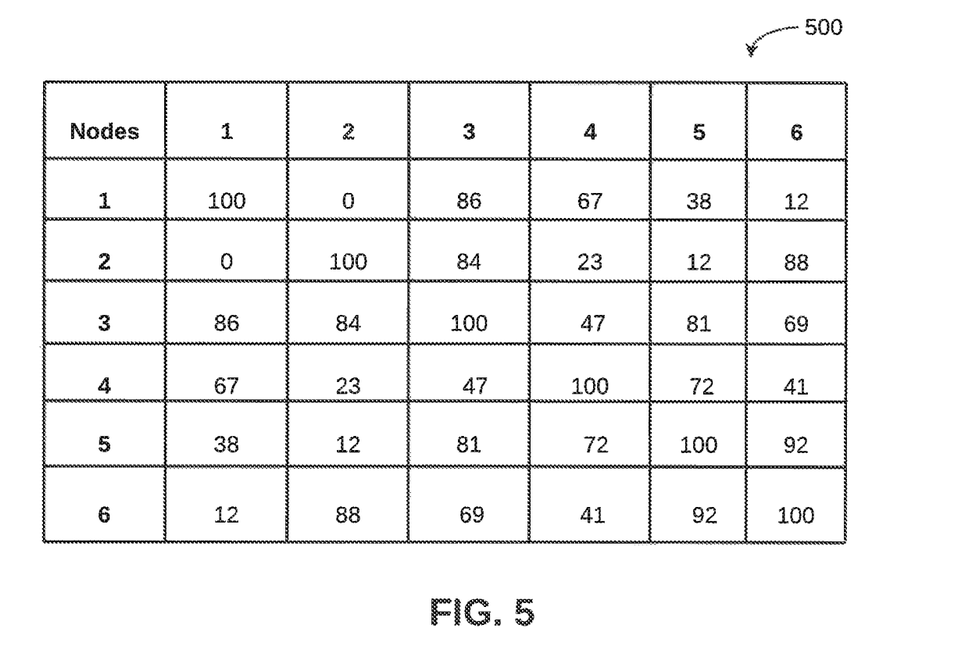
FIG. 5 is an exemplary table representing co-occurring nodes, in a particular layer of the ANN based image classifier, for a particular class, in accordance with some embodiments of the present disclosure.

Referring now to FIG. 5, an exemplary table 500 representing co-occurring nodes, in a particular layer of the ANN based image classifier, for a particular class is illustrated, in accordance with some embodiments of the present disclosure. It should be noted that the table 500 is derived based on co-occurring nodes for a number of training images (say, 100), in the training image dataset, that belong to the particular class. The two-dimensional matrix of nodes in a layer is converted into one-dimensional array. In the table 500, for each of the nodes plotted on x-axis, the co-occurring relevant nodes plotted on y-axis may be marked as "1". The remaining values in the grid may be filled with "0". Therefore, the grid is symmetric about the principal diagonal. Again, by way of an example, in the table 500, six nodes are taken into consideration for a layer. When the node is considered based on its relative relevance, the co-occurring nodes are marked with "1" while the remaining nodes are marked with "0". In an embodiment, for each training image of a given class in the training image dataset, a grid is computed. The grids for all the training images of the given class (say, 100) may be then added one by one in order to form the resultant grid, represented by the table 500. In another embodiment, a single grid is maintained and added cumulatively for all the training images of the given class (say, 100).

The numbers in the grid (i.e., 100 (between nodes 1-1), 86 (between nodes 3-1), 67, 38, 12, 84, 23 etc.) represent co-occurrence between two nodes from among the data points (i.e., training images). In an example, if 100 data points are considered, the maximum possible number in the grid is 100 ('1' for each data point). However, only the nodes above about 80% co-occurrence or grid value (i.e., occurring together in at least about 80% of data points) may be considered. It should be noted that the threshold of at least about 80% may be pre-defined (i.e., hard coded) or user-defined (i.e., configurable based on user requirement). Additionally, relative relevance may be considered so as to further reduce the grid size.

Figure 6:
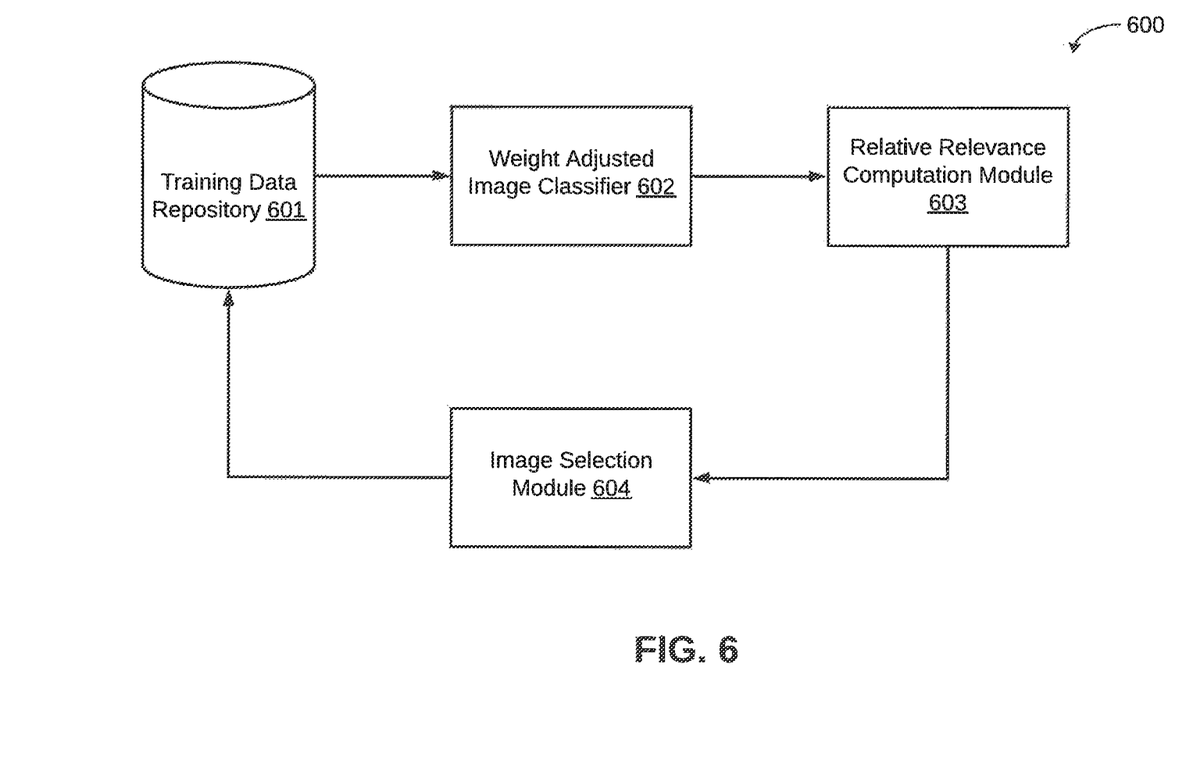
FIG. 6 is a block diagram of an exemplary system for implementing iterative training of the ANN based image classifier, in accordance with some embodiments of the present disclosure.

Referring now to FIG. 6, a block diagram of an exemplary system 600 for implementing iterative training of the ANN based image classifier is illustrated, in accordance with some embodiments of the present disclosure. The system 600 includes a training data repository 601, a classifier unit 602, relative relevance computation module 603, and image selection module 604. The classifier unit 602 may implement the ANN based image classifier including weight adjusted image classifier. A training data from the training data repository 601 may be applied to the weight readjusted image classifier (implemented by the classifier unit 602) to obtain results that are more accurate (i.e., improved classification). The results are again analyzed, and a heat map is created to check whether the features are now equally distributed among different classes.

If the distribution is not equal, the image selection module 604 determines which part of the images are not given importance. In an example, if some region of image is important for classification as evident from the heat map, but only few images are trained with this type of images, then there is a requirement of more images to train the classifier with these relevancies. Thus, from the training data repository 601, only such type of images may be used for retraining the classifier. The user may obtain required information from the heat map projected to image space and interactively providing additional training datasets of specific type, where a certain object in a specific posture is required to be available to make the classifier to learn better.

Further, the selection of similar images that has high relevance for classification happens through the image selection module 604. The image selection module 604 includes heat map generating module that generates the heat map for all training images. Thus, the training image whose heat map includes relevant parts to reduce imbalance for training data may be selected for re-training based on the feedback from the relative relevance computation module 603.

Consider a scenario where a person is travelling in an autonomous car. Suddenly, he/she finds that the car stopped abruptly for no reason for a while and then started on its own after a few seconds. This surprising behavior makes him/her to complain the vendor, who initiates an investigation. When the vendor's technical team try to find the reason, the team identifies that the car had stopped when it encountered a "zebra" on the way. The "zebra" was mistakenly classified as a "zebra cross" that triggered the process of stopping the car for a few seconds (when in front of the "zebra cross"), instead of avoiding the "zebra" and continuing with the journey. Therefore, due to misclassification, "zebra" is recognized as "zebra cross" and the process to stop the car for a few seconds in front of the "zebra cross" is triggered. This investigation point-outs issue with the accuracy of the image classification model of the car. As a part of the resolution, the classifier model is provided with additional training in order to differentiate between zebra and zebra crossing. In other words, the model is trained with more data and features related to zebra crossing class than for zebra class. Thus, the imbalance may be rectified by targeting the distinct features in the two classes.

The present invention may provide many advantages in order to overcome the problems encountered in conventional systems and methods. As discussed above, conventional techniques provide reduced feature vector, which is generic, has less variables, with sufficient accuracy. In case of high dimensional images, these techniques do not guarantee to include class specific information. In contrast, the present invention provides the feature vector rich with class information in addition to providing advantages provided by the conventional techniques. The feature vector rich with class information is key to improve the behavior of classification models/classifiers and many other image-processing models. Thus, the invention helps in enhancing the performance with less computations and good accuracy.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

Figure 7:
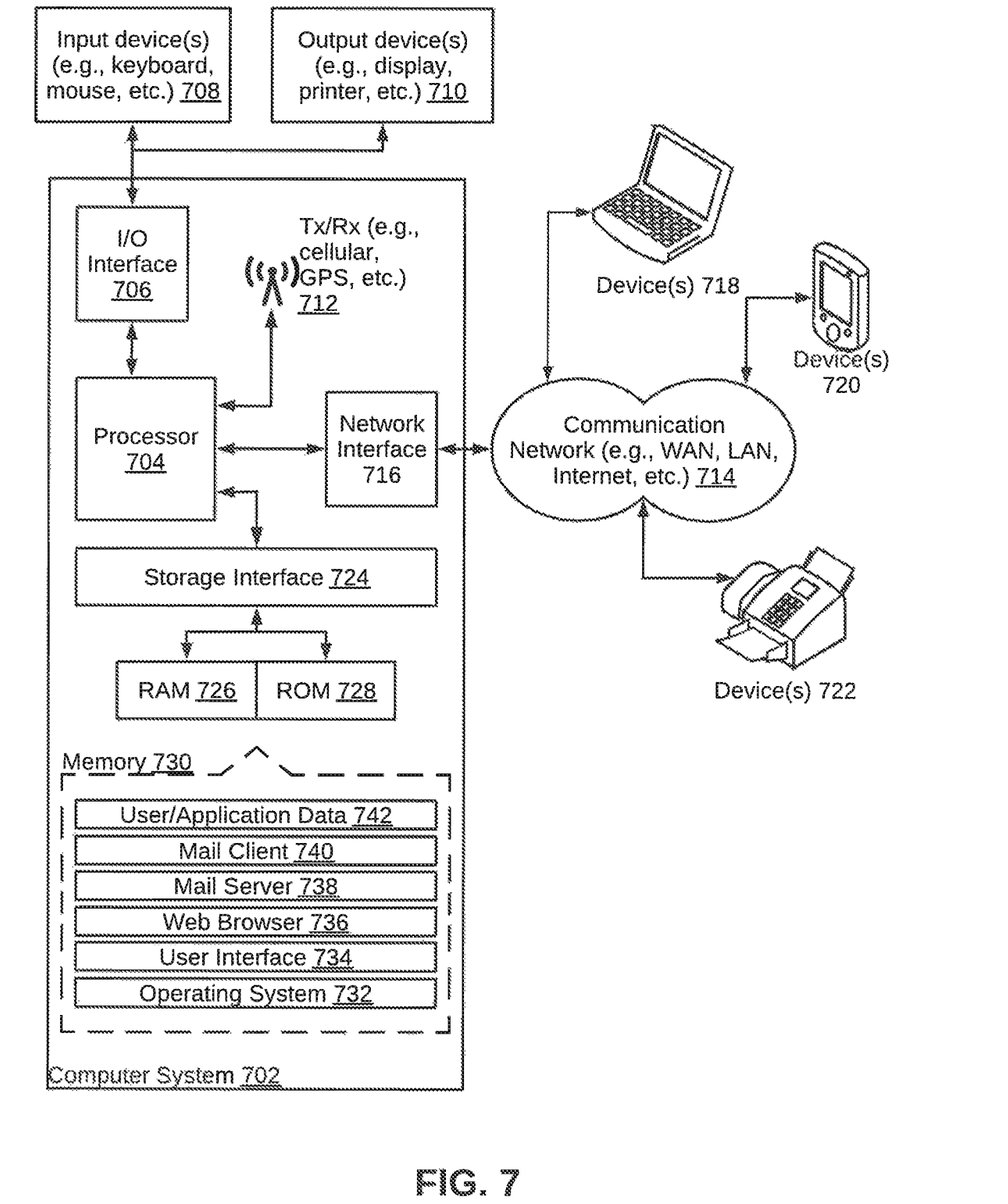
FIG. 7 illustrates a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 7, a block diagram of an exemplary computer system 702 for implementing various embodiments is illustrated. Computer system 702 may include a central processing unit ("CPU" or "processor") 704. Processor 704 may include at least one data processor for executing program components for executing user or system-generated requests. A user may include a person, a person using a device such as such as those included in this disclosure, or such a device itself. Processor 704 may include specialized processing units such as integrated system (bus) controllers, memory management control units, floating point units, graphics processing units, digital signal processing units, etc. Processor 704 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON processor or other line of processors, etc. Processor 704 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 704 may be disposed in communication with one or more input/output (110) devices via an I/O interface 707. I/O interface 707 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 706, computer system 702 may communicate with one or more I/O devices. For example, an input device 708 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 710 may be a printer, fax machine, video display (for example, cathode ray tube (CRT), liquid crystal display (LCD), light-emitting diode (LED), plasma, or the like), audio speaker, etc. In some embodiments, a transceiver 712 may be disposed in connection with processor 704. Transceiver 712 may facilitate various types of wireless transmission or reception. For example, transceiver 712 may include an antenna operatively connected to a transceiver chip (for example, TEXAS® INSTRUMENTS WILINK WL1286® transceiver, BROADCOM BCM4550IUB8® transceiver, INFINEON TECHNOLOGIES® X-GOLD 718-PMB9800® transceiver, or the like), providing IEEE 802.6a/b/g/n, Bluetooth, FM, global positioning system (GPS), 2G/3G HSDPA/HSUPA communications, etc.

In some embodiments, processor 704 may be disposed in communication with a communication network 714 via a network interface 716. Network interface 716 may communicate with communication network 714. Network interface 716 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 714 may include, without limitation, a direct interconnection, local area network (LAN), wide area network (WAN), wireless network (for example, using Wireless Application Protocol), the Internet, etc. Using network interface 716 and communication network 714, computer system 702 may communicate with devices 718, 720, and 722. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 702 may itself embody one or more of these devices.

In some embodiments, processor 704 may be disposed in communication with one or more memory devices (for example, RAM 726, ROM 728, etc.) via a storage interface 724. Storage interface 724 may connect to memory 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 730 may store a collection of program or database components, including, without limitation, an operating system 732, user interface application 734, web browser 736, mail server 738, mail client 740, user/application data 742 (for example, any data variables or data records discussed in this disclosure), etc. Operating system 732 may facilitate resource management and operation of computer system 702. Examples of operating systems 732 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 734 may facilitate display, execution, interaction, manipulation, or operation of program components through textual or graphical facilities. For example, user interfaces may provide computer interaction interface elements on a display system operatively connected to computer system 702, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 702 may implement a web browser 736 stored program component. Web browser 736 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APis), etc. In some embodiments, computer system 702 may implement a mail server 738 stored program component. Mail server 738 may be an Internet mail server such as MICROSOFT® EXCHANGE® mail server, or the like. Mail server 738 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 738 may utilize communication protocols such as internet message access protocol (IMAP), messaging application programming interface (MAPI), Microsoft Exchange, post office protocol (POP), simple mail transfer protocol (SMTP), or the like. In some embodiments, computer system 702 may implement a mail client 740 stored program component. Mail client 740 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 702 may store user/application data 742, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The specification has described method and system for training an ANN based image classifier using class-specific relevant features. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of updating an artificial neural network (ANN) based image classifier using class-specific relevant features, the method comprising:
    receiving, by a feature extraction device, the ANN based image classifier, training image dataset, and a plurality of features of the training image dataset;
    determining, by the feature extraction device, a relative relevance value of each of the plurality of features corresponding to each of a set of classes, based on the ANN based image classifier, wherein determining the relative relevance value of each of the plurality of features corresponding to a given class comprises identifying a set of features out of each of the plurality of features contributing to a class from a set of classes by determining contributing nodes to the class;
    segregating, by the feature extraction device, a set of co-occurring features from the plurality of features for each of the set of classes, based on the training image dataset and the ANN based image classifier, wherein segregating the set of co-occurring features for each of the set of classes comprises identifying a set of neural nodes relevant to a given class based on their co-occurrence for a majority of the training image dataset belonging to the given class;
    identifying, by the feature extraction device, an imbalance in the class-specific relevant features for each of the set of classes based on the relative relevance value of each of the plurality of features corresponding to each of the set of classes; and
    updating, by the feature extraction device, the ANN based image classifier based on the imbalance in the class-specific relevant features and the set of co-occurring features, for each of the set of classes.

2. The method of claim 1, wherein determining the relative relevance value of each of the plurality of features corresponding to a given class comprises applying layer-wise relevance propagation (LRP) technique to the ANN based image classifier to determine a contributory value of each of the plurality of neural nodes to an output of the ANN based image classifier, wherein the output corresponds to the given class.

3. The method of claim 1, wherein identifying the imbalance in the class-specific relevant features for each of the set of classes comprises:
    evaluating the relative relevance value of each of the plurality of features corresponding to a given class; and
    determining at least one of a weak feature, a strong feature, a positive feature, or a negative feature of the given class based on the evaluation, wherein the strong feature or the positive feature is aligned with characteristics of the given class, and wherein the weak feature or the negative feature is not aligned with characteristics of the given class.

4. The method of claim 1, wherein updating the ANN based image classifier comprises:
    generating a weight readjusted image classifier, by updating weights of one or more neurons in the ANN based image classifier, based on the imbalance in the class-specific relevant features and the set of co-occurring features for each of the set of classes;
    evaluating a performance of the weight readjusted image classifier; and
    re-training the weight readjusted image classifier based on the performance.

5. The method of claim 4, wherein training data for re-training the weight readjusted image classifier is selected based on the imbalance in the class-specific relevant features and the set of co-occurring features, for each of the set of classes.

6. A system for updating an artificial neural network (ANN) based image classifier using class-specific relevant features, the system comprising:
    a processor; and
    a memory communicatively coupled to the processor, wherein the memory stores processor-executable instructions, which, on execution, causes the processor to:
        receive the ANN based image classifier, training image dataset, and a plurality of features of the training image dataset;
        determine a relative relevance value of each of the plurality of features corresponding to each of a set of classes, based on the ANN based image classifier, wherein to determine the relative relevance value of each of the plurality of features corresponding to a given class, the processor is further caused to identify a set of features out of each of the plurality of features contributing to a class from a set of classes by determining contributing nodes to the class;
        segregate a set of co-occurring features from the plurality of features for each of the set of classes, based on the training image dataset and the ANN based image classifier, wherein to segregate the set of co-occurring features for each of the set of classes, the processor is further caused to identify a set of neural nodes relevant to a given class based on their co-occurrence for a majority of the training image dataset belonging to the given class;
        identify an imbalance in the class-specific relevant features for each of the set of classes based on the relative relevance value of each of the plurality of features corresponding to each of the set of classes; and
        update the ANN based image classifier based on the imbalance in the class-specific relevant features and the set of co-occurring features, for each of the set of classes.

7. The system of claim 6, wherein determining the relative relevance value of each of the plurality of features corresponding to a given class comprises:
    applying layer-wise relevance propagation (LRP) technique to the ANN based image classifier to determine a contributory value of each of the plurality of neural nodes to an output of the ANN based image classifier, wherein the output corresponds to the given class.

8. The system of claim 6, wherein identifying the imbalance in the class-specific relevant features for each of the set of classes comprises:
- evaluating the relative relevance value of each of the plurality of features corresponding to a given class; and
- determining at least one of a weak feature, a strong feature, a positive feature, or a negative feature of the given class based on the evaluation, wherein the strong feature or the positive feature is aligned with characteristics of the given class, and wherein the weak feature or the negative feature is not aligned with characteristics of the given class.

9. The system of claim 6, wherein updating the ANN based image classifier comprises:
- generating a weight readjusted image classifier, by updating weights of one or more neurons in the ANN based image classifier, based on the imbalance in the class-specific relevant features and the set of co-occurring features for each of the set of classes;
- evaluating a performance of the weight readjusted image classifier; and
- re-training the weight readjusted image classifier based on the performance.

10. The system of claim 9, wherein training data for re-training the weight readjusted image classifier is selected based on the imbalance in the class-specific relevant features and the set of co-occurring features, for each of the set of classes.

11. A non-transitory computer-readable medium for updating an artificial neural network (ANN) based image classifier using class-specific relevant features, having stored thereon, a set of computer-executable instructions causing a computer comprising one or more processors to perform steps comprising:
- receiving the ANN based image classifier, training image dataset, and a plurality of features of the training image dataset;
- determining a relative relevance value of each of the plurality of features corresponding to each of a set of classes, based on the ANN based image classifier wherein determining the relative relevance value of each of the plurality of features corresponding to a given class comprises identifying a set of features out of each of the plurality of features contributing to a class from a set of classes by determining contributing nodes to the class;
- segregating a set of co-occurring features from the plurality of features for each of the set of classes, based on the training image dataset and the ANN based image classifier, wherein segregating the set of co-occurring features for each of the set of classes comprises identifying a set of neural nodes relevant to a given class based on their co-occurrence for a majority of the training image dataset belonging to the given class;
- identifying an imbalance in the class-specific relevant features for each of the set of classes based on the relative relevance value of each of the plurality of features corresponding to each of the set of classes; and
- updating the ANN based image classifier based on the imbalance in the class-specific relevant features and the set of co-occurring features, for each of the set of classes.

12. The non-transitory computer-readable medium of claim 11, wherein determining the relative relevance value of each of the plurality of features corresponding to a given class comprises:
- applying layer-wise relevance propagation (LRP) technique to the ANN based image classifier to determine a contributory value of each of the plurality of neural nodes to an output of the ANN based image classifier, wherein the output corresponds to the given class.

13. The non-transitory computer-readable medium of claim 11, wherein identifying the imbalance in the class-specific relevant features for each of the set of classes comprises:
- evaluating the relative relevance value of each of the plurality of features corresponding to a given class; and
- determining at least one of a weak feature, a strong feature, a positive feature, or a negative feature of the given class based on the evaluation, wherein the strong feature or the positive feature is aligned with characteristics of the given class, and wherein the weak feature or the negative feature is not aligned with characteristics of the given class.

14. The non-transitory computer-readable medium of claim 11, wherein updating the ANN based image classifier comprises:
- generating a weight readjusted image classifier, by updating weights of one or more neurons in the ANN based image classifier, based on the imbalance in the class-specific relevant features and the set of co-occurring features for each of the set of classes;
- evaluating a performance of the weight readjusted image classifier; and
- re-training the weight readjusted image classifier based on the performance.

15. The non-transitory computer-readable medium of claim 14, wherein training data for re-training the weight readjusted image classifier is selected based on the imbalance in the class-specific relevant features and the set of co-occurring features, for each of the set of classes.

* * * * *